(No Model.)
J. SPICER.
TELLURIAN.
No. 263,236. Patented Aug. 22, 1882.
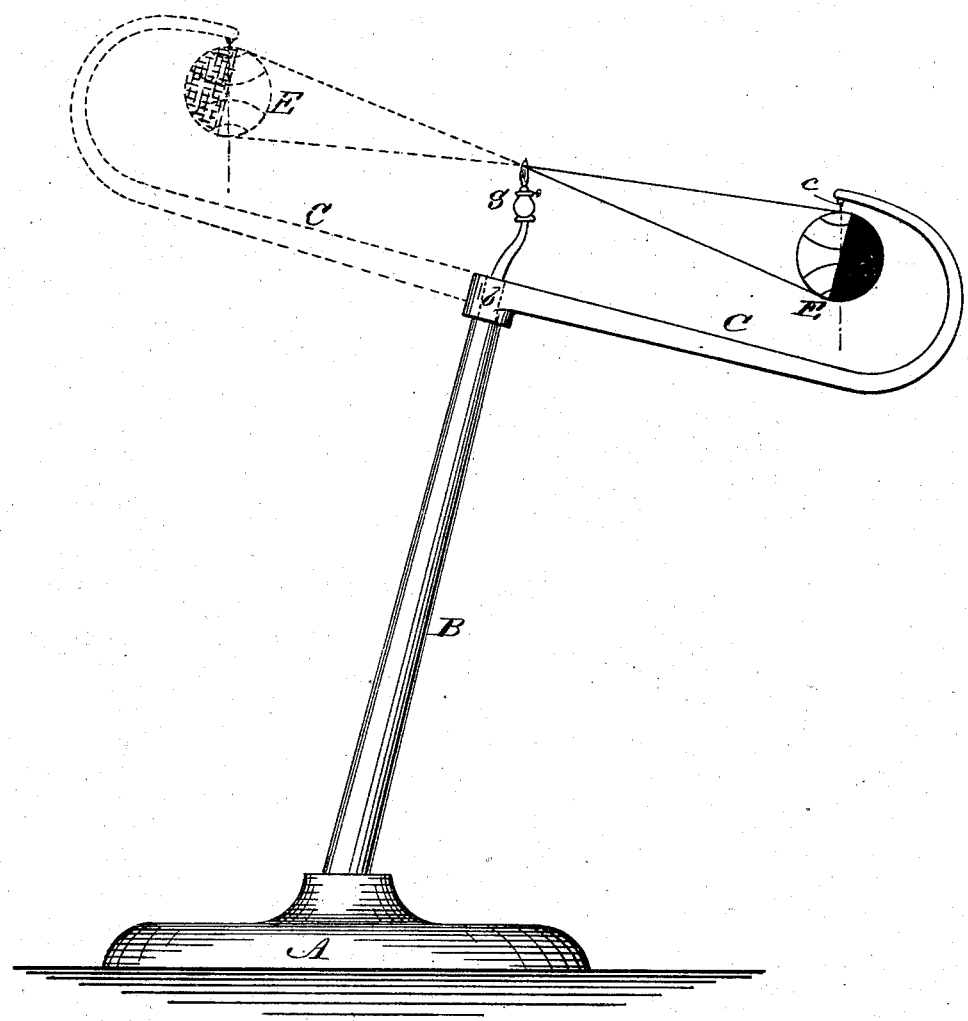
WITNESSES:
C. Neveux
C. Sedgwick
INVENTOR:
J. Spicer
BY Munn & Co
ATTORNEYS.

UNITED STATES PATENT OFFICE.

JEREMIAH SPICER, OF TAYLOR'S ISLAND, MARYLAND.

TELLURIAN.

SPECIFICATION forming part of Letters Patent No. 263,236, dated August 22, 1882.

Application filed May 13, 1882. (No model.)

*To all whom it may concern:*

Be it known that I, JEREMIAH SPICER, of Taylor's Island, in the county of Dorchester and State of Maryland, have invented a new and useful Improvement in Tellurians, of which the following is a full, clear, and exact description.

The object of my invention is to produce an instrument for showing the operation of the causes of day and night and of the seasons, which shall be exempt from certain inconsistencies and defects that are incidental to tellurians generally, and which may be made at such a reduced cost as to be within easy reach of the masses, or so that the same will be in demand for use in primary schools.

Ordinarily, as tellurians are made, the earth is represented as moving in an orbit the plane of which is at right angles to the sun's axis. Consequently the earth has to be tipped or tilted toward and away from the sun in order to show the changes of the seasons. In my improved instrument I obviate this difficulty by causing the earth to move in an orbit the plane of which is at an angle of twenty-three and one-half degrees to the axis of the sun, which is about the angle that the "equator" and the "ecliptic" make with each other, and simply suspend the globe, which represents the earth, at a point that corresponds with the north pole, and depends upon its gravity for keeping its axis vertical or parallel with that of the sun during its entire revolution around the sun. By this mode of suspension and by the inclination of the plane of the earth's orbit, as hereinbefore described, no manipulation to tip or tilt the earth in different directions in order to show the changes of the seasons is necessary, and the globe representing the earth may be readily turned on its own axis to indicate its diurnal motion.

Reference is to be had to the accompanying drawing, which forms part of this specification, and which represents an elevation of my improved tellurian.

A indicates the base of the instrument or apparatus, made of any suitable material, size, and shape. Mounted upon this base is a standard, B, having a spindle or pivot, *b*, on its top, which inclines twenty-three and one-half degrees from the perpendicular or vertical position. Said standard also serves to carry above or by an upward extension of said pivot a lamp or other illuminating device, S, which (or the flame, rather) represents the sun, and will here be designated as such. Arranged to rotate upon or around the pivot *b* is an arm, C, bent or constructed at its outer portion to admit of the suspension from and within its inwardly and upwardly bent end of a globe, E, which represents the earth, and will here be designated as such. The earth E is or may be thus suspended by a short thread, *c*, or in any other free manner that will cause it by its gravity to hang plumb, the point at which it is suspended representing the north pole.

From this description it will be seen that the axis of the earth will be vertical and always parallel during the motion of the earth in its orbit around the sun, with the axis of the latter as represented by the center vertical line of the flame, and that the inclination of the plane of said orbit as produced by the rotation of the arm C on the pivot *b* will show by the light thrown upon the earth the changes of the seasons. Thus the figure in the drawing indicates, on its right-hand side, the rays of light as falling twenty-three and one-half degrees beyond the north pole or point of the earth's suspension. This represents the position of the earth, or northern hemisphere thereof, in summer. On the other hand, when, by the motion of the earth in its orbit, the rotating arm, with its suspended globe, reaches the position indicated by dotted lines at the left hand of the figure in the drawing, the rays of light as falling on the earth will indicate summer in the southern hemisphere. In this way, or as the arm carrying the suspended earth is revolved, the light will fall upon the earth in such manner as to show the different seasons and their intermediate changes.

Of course in an instrument of this simple construction all the natural or true conditions of the earth and sun relatively to each other are not shown, and the earth should be made to move in an elliptic instead of a circular orbit; nor is there any special provision for rotating the earth on its own axis three hundred and sixty-five times and a fraction each revolution it makes around the sun; but the manner in which the earth is carried admits of its being turned at intervals to illustrate its diurnal motion and the changes of day and night, as the rays of the sun fall upon a constant varying half of its surface, leaving its varying remaining half in the shade.

Having thus described my invention, I claim as new and desire to secure by Letters Patent—

1. An apparatus for illustrating the changes of the seasons and diurnal motion of the earth, in which the body that represents the earth is made to move in an orbit around an illuminating device, that represents the sun, at an inclination to the vertical axis of said device, and is freely suspended to preserve by gravitation the vertical position of its axis and to admit of its being turned about its own axis, substantially as specified.

2. The combination of the inclined pivot $b$ on the stand or standard B, the lamp or illuminating device S, the rotating arm C, bent or constructed at its outer end to form an upper suspension means, and the globe E, suspended to hang freely from said outer end portion of the arm, essentially as shown and described, and for the purposes herein set forth.

JEREMIAH SPICER.

Witnesses:
R. L. SPILMAN,
F. T. CHAPLAIN.